United States Patent
McKnight et al.

(10) Patent No.: US 8,109,042 B2
(45) Date of Patent: *Feb. 7, 2012

(54) METHODS FOR VARYING SEAL FORCE IN ACTIVE SEAL ASSEMBLIES FOR DOORS

(75) Inventors: Geoffrey P. McKnight, Los Angeles, CA (US); Cameron Massey, Hawthorne, CA (US); William Barvosa-Carter, Ventura, CA (US); Christopher P. Henry, Newbury Park, CA (US); Guillermo A. Herrera, Winnetka, CA (US); Andrew C. Keefe, Santa Monica, CA (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 398 days.

This patent is subject to a terminal disclaimer.

(21) Appl. No.: 11/076,434

(22) Filed: Mar. 9, 2005

(65) Prior Publication Data

US 2005/0198907 A1 Sep. 15, 2005

Related U.S. Application Data

(60) Provisional application No. 60/552,781, filed on Mar. 12, 2004.

(51) Int. Cl.
*E06B 3/00* (2006.01)
(52) U.S. Cl. .......................... 49/506; 49/475.1; 49/480.1
(58) Field of Classification Search .................. 49/475.1, 49/477.1, 506, 480.1; 296/146.9
See application file for complete search history.

(56) References Cited

U.S. PATENT DOCUMENTS

| | | | | |
|---|---|---|---|---|
| 4,399,317 A * | 8/1983 | Van Dyk, Jr. | ................ | 174/364 |
| 4,579,192 A * | 4/1986 | Mueller | ........................ | 277/312 |
| 4,676,025 A * | 6/1987 | Mattscheck et al. | ......... | 49/477.1 |
| 4,761,917 A | 8/1988 | Knecht et al. | | |
| 4,805,347 A | 2/1989 | Smith | | |
| 4,813,184 A * | 3/1989 | Weimar | ........................ | 49/477.1 |
| 4,956,625 A | 9/1990 | Cardone et al. | | |
| 4,989,369 A * | 2/1991 | Maass | ............................ | 49/477.1 |
| 5,046,285 A | 9/1991 | Fratini, Jr. et al. | | |
| 5,181,341 A * | 1/1993 | Keys et al. | ................... | 49/477.1 |
| 5,361,542 A * | 11/1994 | Dettloff | ........................ | 49/477.1 |
| 5,390,974 A * | 2/1995 | Theodorakakos | ......... | 296/146.9 |
| 5,489,104 A * | 2/1996 | Wolff | ................................ | 277/646 |
| 5,668,744 A | 9/1997 | Varadan et al. | | |
| 6,009,669 A * | 1/2000 | Jardine et al. | ................... | 49/316 |
| 6,009,699 A | 1/2000 | Delvael | | |
| 6,176,934 B1 | 1/2001 | Nelson | | |
| 6,393,765 B1 | 5/2002 | Goldstein et al. | | |

(Continued)

OTHER PUBLICATIONS

"Silicone-Rubber Microwaves Actuated by Paraffin" NASA Tech Briefs NASA Tech Briefs Online by Category, Mechanics, http://www.nasatech.com/Briefs/Sept04/NPO30519.html.

(Continued)

*Primary Examiner* — Gregory J. Strimbu (57) ABSTRACT

Methods for varying seal force in active seal assemblies for doors employ active materials that can be controlled and remotely changed to alter the seal effectiveness, wherein the active materials actively change modulus properties such as stiffness, or a combination of modulus and shape in response to an activation signal. In this manner, in seal applications such as a vehicle door application, door opening and closing efforts can be minimized yet seal effectiveness can be maximized.

7 Claims, 8 Drawing Sheets

(POWER OFF)

U.S. PATENT DOCUMENTS

| | | |
|---|---|---|
| 6,485,029 B1 | 11/2002 | Moody et al. |
| 6,489,871 B1 | 12/2002 | Barton |
| 6,615,545 B2 | 9/2003 | Rogers, Jr. et al. |
| 6,702,301 B1 | 3/2004 | Davies et al. |
| 7,059,664 B2 * | 6/2006 | Aase et al. ............ 296/180.5 |
| 2002/0113380 A1 | 8/2002 | Clark |
| 2002/0152688 A1 | 10/2002 | Dron |
| 2004/0008853 A1 | 1/2004 | Pelrine et al. |
| 2004/0253566 A1 | 12/2004 | Quinn et al. |

OTHER PUBLICATIONS

"Dielectric Elastomer Actuators in the Development of a 'Mechatronic Muscle'", Allish O'Halloran et al., Department of Electronic Engineering, NUI, Galway Faculty of Engineering Research Day 2004 (3 pgs).

* cited by examiner

(POWER OFF)    (POWER ON)    (POWER OFF)    (POWER ON)

(POWER OFF)      (POWER ON)

(POWER OFF)         (POWER ON)

(POWER OFF)  Fig. 6A (POWER ON)  Fig. 6B (POWER OFF)  Fig. 7A (POWER ON)  Fig. 7B

Fig. 16B
(POWER ON)

Fig. 16A
(POWER OFF)

METHODS FOR VARYING SEAL FORCE IN ACTIVE SEAL ASSEMBLIES FOR DOORS

CROSS REFERENCE TO RELATED APPLICATIONS

The present application relates to and claims priority to U.S. Provisional Application No. 60/552,781 entitled, "Active Seal Assemblies" filed on Mar. 12, 2004, the disclosure of which is incorporated by reference herein in its entirety.

BACKGROUND

This disclosure relates to active material adapted to selectively vary, decrease, or increase the seal force, the seal effectiveness for the prevention or mitigation of noise, water or the like through the seal assembly, or the ease with which entry or egress into an automotive vehicle is accomplished by an operator or an occupant thereof.

Current methods and assemblies for sealing opposing surfaces such as doors and trunk lids, for example, include the use of flexible elastic membranes and structures that compress upon pressing contact of one component against another component. Because of this, to provide effective sealing engagement, closure force must sufficient to overcome any compressive forces associated with the seal assembly. Typical materials employed for seal assemblies are passive materials and generally include various forms of elastomers, e.g., foams and solids, that are formed into structures having solid and/or hollow cross sectional structures. The geometries of the cross sections are varied and may range from circular forms to irregular forms having multiple cavities, channels, slots and/or extending vanes.

Sealing assemblies are typically utilized for sound, airflow, and/or fluid management. The seals generally are exposed to a variety of conditions. For example, for vehicle applications, door seals generally are exposed to a wide range of environmental conditions such as rain, snow, sun, humidity and temperature conditions, and the like. As noted above, current materials utilized for automotive seals are generally passive. That is, other than innate changes in the modulus properties of the seal material due to aging and environmental stimuli, the stiffness and cross sectional geometries of the seal assemblies cannot be remotely changed or controlled on demand.

A problem with current passive seals is the tradeoff in seal effectiveness. Increasing the interface pressure and/or contact area of the seal can generally increase seal effectiveness. However, in sealing applications, such as in vehicle doors, the increased interface pressure and/or contact area by passive seal assemblies generally results in increased door opening and closing efforts.

Accordingly, it is desirable to have active material based seal assemblies that can be controlled and remotely changed to alter the seal effectiveness, wherein the active seal assemblies change stiffness properties on demand, for example, by changing the material's elastic modulus, or geometry by actively changing the cross-sectional shape of the seal structure. In this manner, in seal applications such as the vehicle door application noted above, door opening and closing efforts can be minimized yet seal effectiveness can be maximized by actively manipulating the seal properties.

BRIEF SUMMARY

Disclosed herein are active material based seal assemblies and methods of use. In one embodiment, a method for decreasing a closure force of a door in a doorframe comprises attaching an active material based seal assembly to a selected one of the door or the doorframe, wherein the active material based seal assembly comprises an active material; activating the active material and changing at least one attribute in response to an activation signal, wherein the change in at least one attribute changes a modulus property and/or shape of the active material based seal assembly; closing and latching the door against the door frame; and deactivating the active material and increasing a seal pressure between the door and the doorframe.

In another embodiment, a method for decreasing a force to close a door in a doorframe comprises attaching an active material based seal assembly to a selected one of the door or the doorframe, wherein the active material based seal assembly comprises an active material; closing and latching the door against the door frame; and activating the active material and changing at least one attribute in response to an activation signal, wherein the change in at least one attribute increases a seal pressure of the active material based seal assembly against the door and the doorframe.

A method for decreasing a force to opening a door in a doorframe comprises attaching an active material based seal assembly to a selected one of the door or the doorframe, wherein the active material based seal assembly comprises an active material; activating the active material and changing at least one attribute in response to an activation signal, wherein the change in at least one attribute increases a seal pressure of the active material based seal assembly against the door and the door frame; unlatching and positioning the door away from the door frame; and deactivating the active material.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Disclosed herein are active material based seal assemblies and methods of use, wherein the diameter, shape, orientation, and/or volume of the active material based seal assemblies can be adjusted on-demand. The active material based seal assemblies generally comprise an active material adapted for sealing engagement between two opposing surfaces, an activation device in operative communication with the active material, and a controller in operative communication with the activation device for selectively providing an activation signal to the active material. Preferably, at least one of the two opposing surfaces is movable relative to the other surface. For door applications, the active material based seal assemblies can be programmed to vary, decrease, or increase the seal force, the seal effectiveness for the prevention or mitigation of noise, water or the like through the seal, or the ease with which entry or egress into a vehicle is accomplished by the vehicle operator or occupant. Although reference will be made herein to automotive applications, it is contemplated that the active material based seal assemblies can be employed for sealing opposing surfaces for various interfaces such as refrigerator doors, windows, drawers, and the like. For automotive applications, the active material based seal assemblies are preferably utilized between an opening in a vehicle and a surface in movable engagement with the opening such as a vehicle door.

The active material based seal assemblies generally comprise an active material that can be selectively activated to manipulate the properties of the seal structure. The term "active material" as used herein shall refers to those classes of materials which exhibit a reversible change in at least one physical property or attribute such as dimension, shape, orientation and/or elastic modulus when subjected to at least one of many different types of applied activation signals, as such term is defined and understood by those of ordinary skill in the art. examples of types of signals include thermal, electrical, magnetic, stress, and the like. One class of active materials is shape memory materials. These materials exhibit a shape memory. Specifically, after being deformed pseudoplastically, shape memory materials can be restored to their original shape by application of an appropriate field. In this manner, shape memory materials can change to a determined shape in response to an activation signal. Suitable shape memory materials include, without limitation, shape memory alloys (SMA), ferromagnetic SMAs (FSMA), and shape memory polymers (SMP). A second class of active materials can be considered as those that exhibit a change in at least one attribute when subjected to an applied field but revert back to their original state upon removal of the applied field. Active materials in this category include, but are not limited to, piezoelectric materials, electroactive polymers (EAP), two-way trained shape memory alloys, magnetorheological fluids and elastomers (MR), electrorheological fluids (ER), composites of one or more of the foregoing materials with non-active materials, combinations comprising at least one of the foregoing materials, and the like. Of the above noted materials, SMA and SMP based active seal assemblies preferably include a return mechanism to restore the original geometry of the sealing assembly. The return mechanism can be mechanical, pneumatic, hydraulic, pyrotechnic, or based on one of the aforementioned smart materials. By utilizing the active material in the active material based seal assembly, the seal assembly can reversibly change its modulus and/or dimensional properties to provide improved sealing engagement between opposing surfaces such as may be desired for door opening and closing. Applying an activation signal to the active material can effect the reversible change. Suitable activation signals will depend on the type of active material. As such, the activation signal provided for reversibly changing the shape and modulus properties of the seal structure may include a heat signal, an electrical signal, a magnetic signal, and combinations comprising at least one of the foregoing signals, and the like.

Optionally, the sealing structure of the active material based seal assembly may include one or more sensors that are used in combination with enhanced control logic to, for example, maintain the same level of sealing force independent of aging effect and environmental conditions, e.g., humidity, temperature, pressure differential between interior and environment, and the like.

In the various embodiments disclosed herein, the seal structure, unless formed entirely of the active material, can generally be formed of various rubbers, foams, elastomers, and the like typically utilized for passive seal assemblies, which can be utilized in combination with the active material to provide the active material based seal assembly. As such, suitable seal structure materials in addition to the active materials include, but are not intended to be limited to, styrene butadiene rubber, polyurethanes, polyisoprene, neoprene, chlorosulfonated polystyrenes, and the like.

In one embodiment, the active material based seal assembly is configured such that the external diameter, shape, orientation, or volume of a seal body changes as a result of a pulling or pushing action caused by a active material actuator internally or externally disposed with the seal body. In this manner, the force with which the seal is made can be selectively varied over the area that the seal occurs. This is especially advantageous for door applications since vehicle door closing and opening efforts can be reduced. Vehicle doors typically include a passive seal body peripherally disposed about the door and adapted to compress upon contact with a doorframe to seal the gap between these two vehicle parts. By selectively varying the orientation of the active material based seal assemblies as described herein along the perimeter of the door, seal force and/or area can be actively manipulated and the seal effectiveness can be altered. Similarly, in terms of door opening, the forces associated with disengaging the latching mechanism must be overcome to provide door opening. By selectively activating the active material based seal assembly, the seal assembly can overcome any opening forces as well as assist in the initial door opening.

Figure 1A:
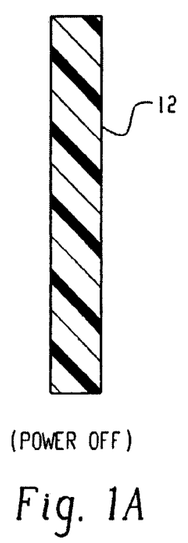
FIGS. 1a and 1b illustrates a sectional view of an active material based seal assembly in the power-off and power-on states in accordance with one embodiment.
Figure 1B:
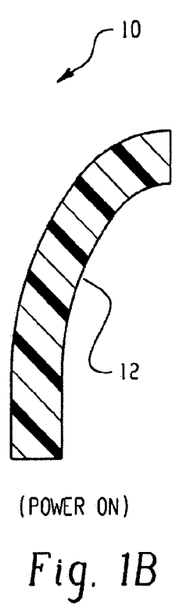
Figures 2A, 2B:
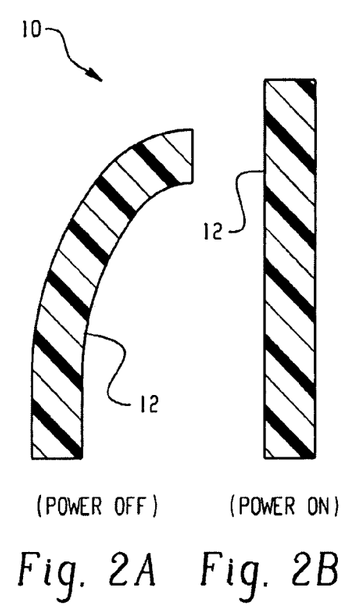
FIGS. 2a and 2b illustrates a sectional view of an active material based seal assembly in the power-off and power-on states in accordance with another embodiment.

Turning now to FIGS. 1a and 1b, and FIGS. 2a and 2b, an exemplary active material based seal assembly is shown in lateral cross section (i.e. a cross section along the length of the seal), generally indicated by reference numeral 10. The seal assembly is configured as a flap. The illustrated active material based seal assembly comprises an active material 12, which can be activated to change the orientation of the flap. The active material is in operative communication with an activation device (not shown) and a controller (not shown). The controller is adapted to accept various input signals from devices such as sensors which can be used to determine, for example, the status of the door position, the vehicle speed, environmental conditions such as temperature and moisture content, and the like as may be desired. The controller processes the input information and then sends an appropriate signal to the activation device. In turn, the activation device provides a suitable activation signal to the active material such that the desired at least one attribute is changed. It is understood that the following embodiments of active material seal assemblies would include an activation device controlled by a controller for selectively providing a suitable activation signal to the active material unless otherwise noted. As shown in FIGS. 1a and 1b, activation of the active material causes a change from an original linear orientation to an activated curvilinear orientation. In FIGS. 2a and 2b, activation of the active material causes a change from an original curvilinear orientation to an activated linear orientation.

The active material based seal assembly can function by applying pressure to the seal structure, for example, upon closure and latching of a door. This permits the seal structure to achieve the desired amount of appropriate seal surface area and pressure, while reducing the force necessary to compress the seal and latch the door. The active material based seal assembly can be activated for a variety of conditions. For example, activating the active material, i.e., a power-on condition, can minimize the overall dimensions of the seal assembly or may move the seal assembly, e.g., a flap, away from sealing contact with the two opposing surfaces. Alternatively, the desired geometry of the seal assembly for sealing is achieved upon deactivation of the active material, i.e., a power-off condition. The geometry of the seal structure is then pulled back (e.g., reduced) when the power is applied to the active material. By way of illustration, power is preferably applied to the active material between the time when the door is unlatched and latched. This embodiment is generally preferred for most door applications since the door will remain sealed in case of power interruption. In addition, when the vehicle is not in operation, no power is required to maintain the seal, which could result in a drain on the vehicle battery. In some embodiments, an energy storage device such as a capacitor could be employed to minimize any drain on the battery.

As will be appreciated by those in the art, the active material may form a portion of the seal assembly, may form its entirety, or may be disposed as an actuator in operative communication with an end of the flap to effect movement of the flap in response to an activation signal. One of the many advantages that result from the use of the active materials is the elimination of bulky, and complicated motors; which reduces the number of possible failure modes associated with this conventional approach.

Figure 3A:
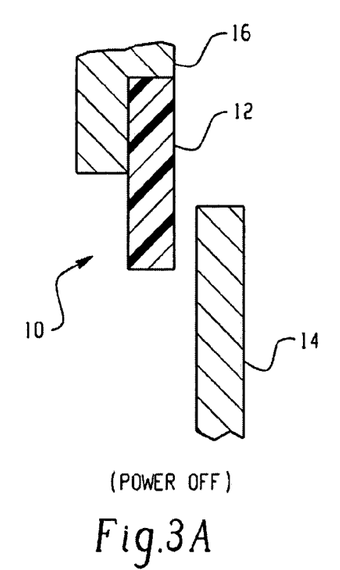
FIGS. 3a and 3b illustrates a sectional view of an active material based seal assembly in the power-off and power-on states in accordance with another embodiment.
Figure 3B:
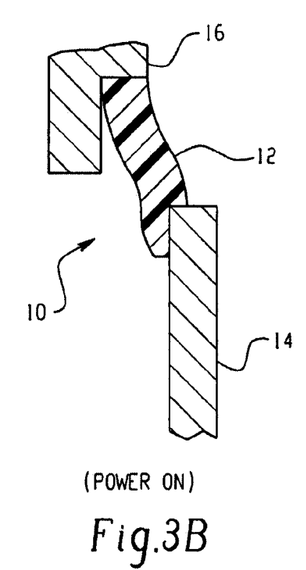

FIGS. 3a and 3b, and FIGS. 4a and 4b illustrate two embodiments of active material based seal assemblies that employ power-on sealing. In FIGS. 3a and 3b, a movable surface 14 (e.g., a door) is moved into position with a stationary surface 16 (e.g., a door frame). The active material based seal assembly 10 is coupled to the stationary surface 16. As the movable surface 14 is moved into position, the active material 12 is activated to cause a change in shape orientation to the geometry of the releasable seal assembly 10. The change in shape orientation drives the mating and increases the mutual pressure of the two sealing surfaces.

Figure 4A:
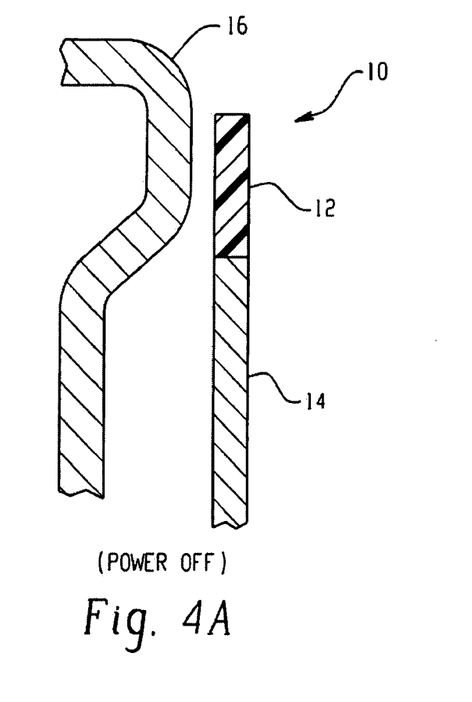
FIGS. 4a and 4b illustrates a sectional view of an active material based seal assembly in the power-off and power-on states in accordance with another embodiment.
Figure 4B:
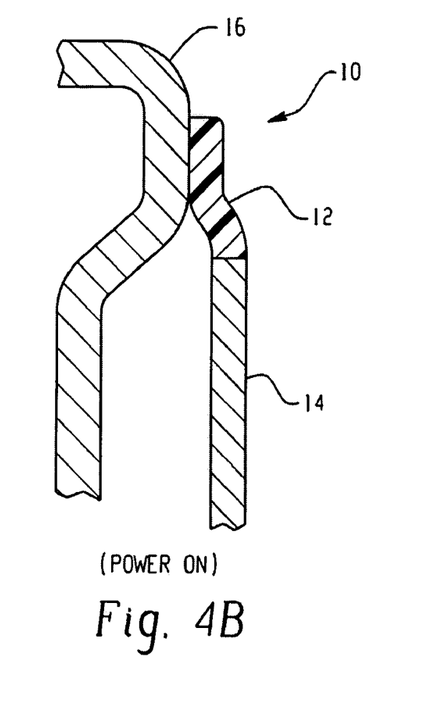

In FIGS. 4a and 4b, the active material based seal assembly is placed on the moving surface 14 of the sealing surfaces. When the movable surface 14 is moved into position and latched to the stationary surface 16, the active material 12 is activated causing the releasable seal assembly 10 to change its shape orientation and increase the pressure and contact area of the sealing surfaces.

Figure 5:
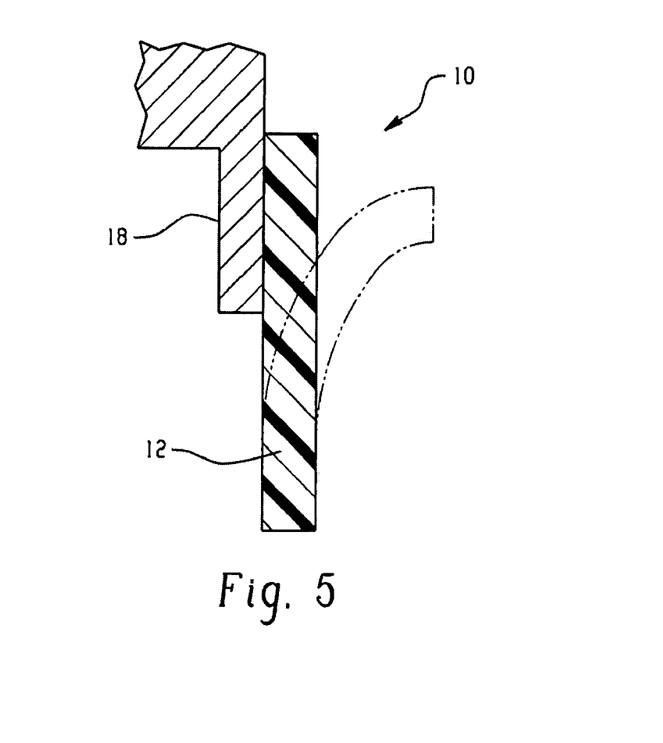
FIG. 5 illustrates a sectional view of an active material based seal assembly in the power-off and power-on states in accordance with another embodiment.

FIG. 5 illustrates another embodiment, wherein the active material based seal assembly is configured to provide power off sealing. In the power off state the seal assembly is configured to provide a substantially linear orientation. Activation of the active material (power-on) causes the seal assembly to assume a curvilinear shape orientation as shown by the dotted line. The active material is configured to move the flap away from the mating surface 18. The sealing surfaces are then brought into close proximity while maintaining power to the active material so as to provide latching. The activation signal is then discontinued, wherein the seal assembly shape orientation changes from the curvilinear shape to a straightened orientation. The change causes the seal assembly to sealingly engage the mating surface 18.

Optionally, the seal assembly 10 can be adapted to provide a curvilinear shape orientation in the absence of an activation signal. The curvilinear shape is oriented towards the mating surface 18. In this process, before door closure, the active material is activated so that the seal assembly 10 deforms to the linear orientation. After the door is closed and latched, the power is discontinued so that the seal assembly 10 changes it shape orientation to the curvilinear shape. Because the orientation of the curvilinear shape is towards the mating surface 18, increased seal pressure as well as contact area results.

The embodiments described in relation to FIG. 5 provides door closure with minimal or no closing force. That is, the necessary compressive forces typically associated with passive seals are minimized or eliminated by selective activation of the active material based seal assembly as described. Moreover, it should be apparent that there is seal effectiveness is maintained, especially as it pertains to water and noise entry through the seal interface. As such, the active material based seal assembly can be configured to actively close the gap between mating surfaces, thereby minimizing the effect of mechanical tolerances.

Although reference has been made to an active material based seal assembly in the form of a flap, it should be apparent that the methods described herein are independent of form or configuration. For example, the seal assembly can be in the form of a tube comprising an active material, in whole or in part, such that activation of the active material causes extensional or volumetric changes. In this manner, door closing and opening efforts can be selectively controlled.

Figure 6A:
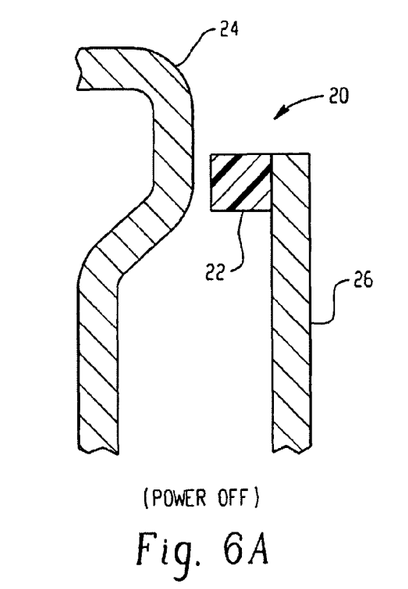
FIGS. 6a and 6b illustrates a sectional view of an active material based seal assembly in the power-off and power-on states in accordance with another embodiment.
Figure 6B:
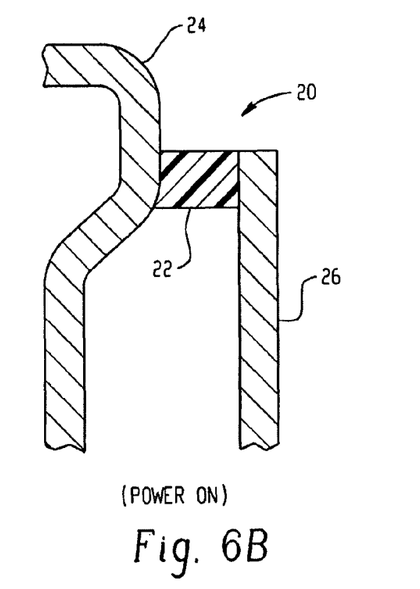

In FIGS. 6a and 6b, there is shown an active material based seal assembly generally designated by reference numeral 20, wherein the active material 22 selectively extends to provide a pushing force on an opposing surface 24 to provide effective seal engagement. This approach shows a version of power on sealing application. The active material based seal assembly 20 comprises a rigid member 26 upon which the active material 22 is attached, which is in proximity to the opposing surface 24 during sealing engagement. The member 26 can be any component within the vehicle that forms a closure or seal, e.g., door frame, door, window, window frame, etc. The actual distance from the opposing surface 24 to the active material based seal assembly 20 generally depends on the amount of displacement provided by the particular active material 22 used. With a structure that provides a mechanical advantage, more displacement can be achieved from the active material but with a concomitant decrease in available force. Once activated, the active material based seal assembly 20 will push against the opposing surface 24 so as to supply adequate pressure and contact area to form the seal. In door applications, this would be advantageous over current passive seal technology because little effort must be expended to close the door. In the prior art, door closures generally require a force sufficient to compress the passive seal disposed between the door and opposing surface to obtain sealing engagement, thereby requiring substantial closure force to effect complete closure. By using the active material in the manner described, the force required for compression can be eliminated and/or minimized relative to prior art passive seal structures.

To effect the sealing engagement, the active material 22 undergoes a change in at least one attribute in response to an appropriate activation signal. For example, the active material may be adapted to change a length dimension, shape, orientation, rotation or modulus property, for example. It is the change in the at least one attribute that is manipulated to effect the sealing engagement, which can vary depending on the active material employed.

Figure 7A:
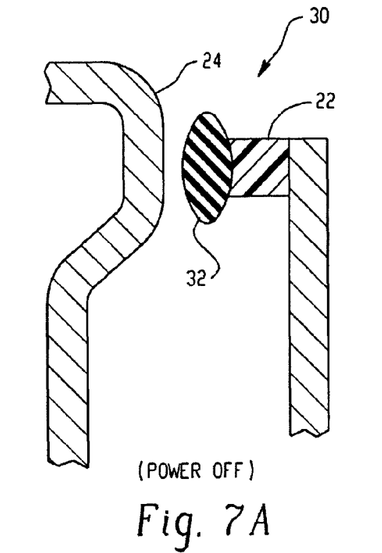
FIGS. 7a and 7b illustrates a sectional view of an active material based seal assembly in the power-off and power-on states in accordance with another embodiment.
Figure 7B:
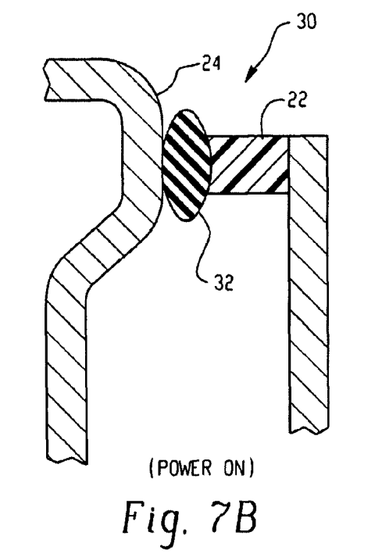

In FIGS. 7a and 7b, the active material based seal assembly 30 includes an elastic body 32 formed of a non-active material is disposed intermediate the active material 22 and the opposing surface 24. Depending on the intended application, the elastic body 32 can be attached directly to the opposing surface 24 or to the active material based seal 22. In this manner, the change in at least one attribute to the active material causes the elastic body 32 to compress against the opposing surface 24 to selectively provide a sealing engagement between the door and doorframe, for example.

Figure 8A:
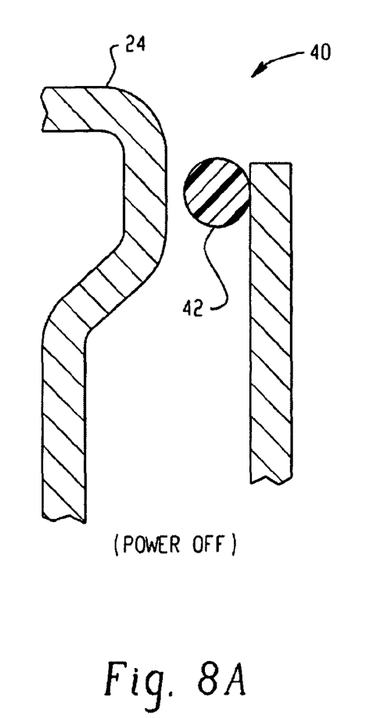
FIGS. 8a and 8b illustrates a sectional view of an active material based seal assembly in the power-off and power-on states in accordance with another embodiment.
Figure 8B:
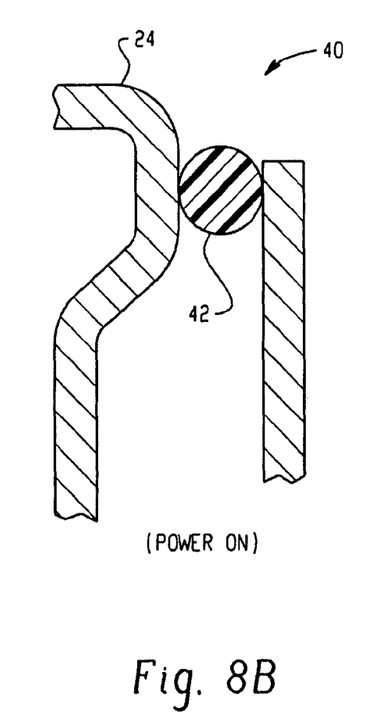

In FIGS. 8a and 8b, an active material based seal assembly 40 is shown that provides a volumetric change upon activation. The seal assembly 40 comprises an active material 42 that is adapted to change its dimension in the power on-mode such that upon activation the active material based seal 42 expands.

Figure 9:
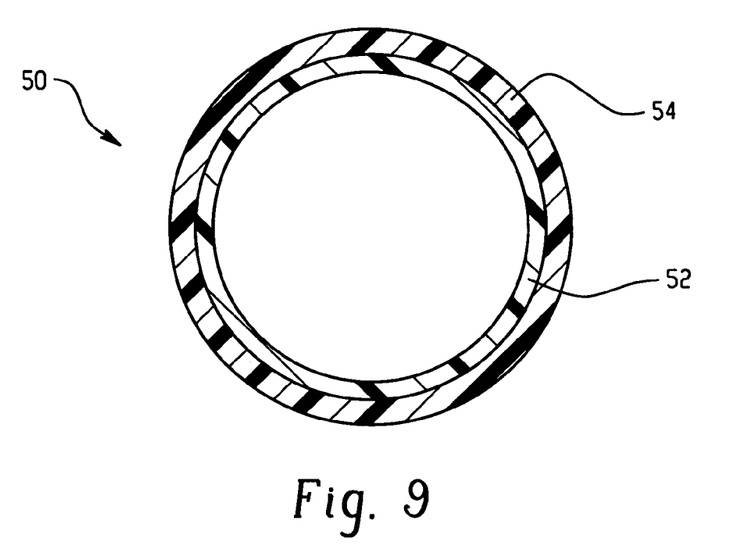
FIGS. 9 and 10 are a cross section and perspective view, respectively, of an active material based seal assembly in accordance with another embodiment.
Figure 10:
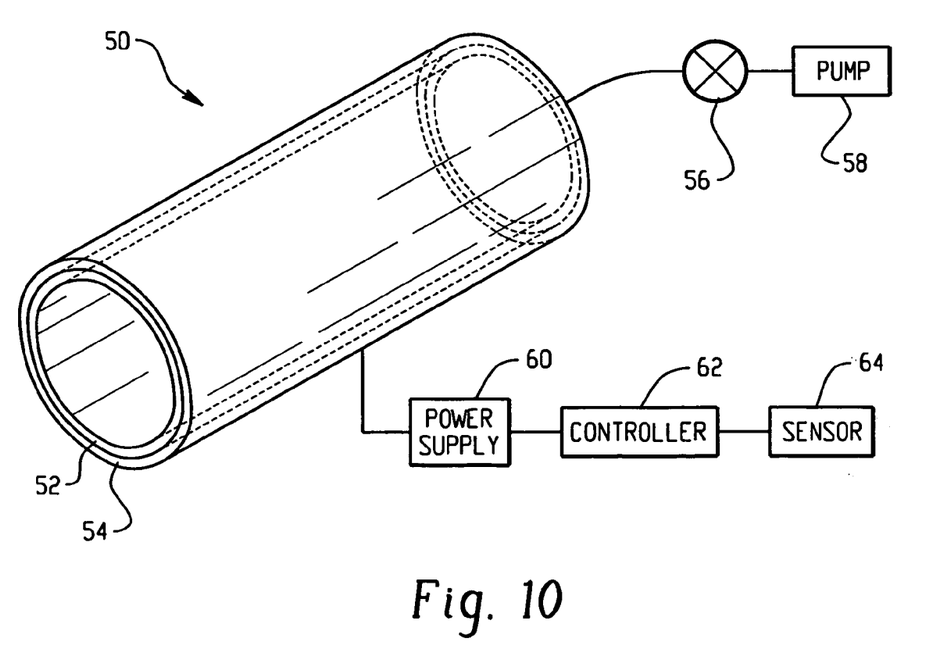

One exemplary embodiment of this type of seal assembly is shown in FIGS. 9 and 10. The tubular seal structure 50 is composed of a dielectric elastomer material 52 and an elastic outer covering 54. As shown more clearly in FIG. 10, the tubular seal structure 50 is in fluid communication with a pressure inlet valve 56 and air supply or pump 58. Upon activating the dielectric elastomer material 52 by applying voltage supplied by the power supply 60, the modulus of the dielectric elastomer material 52 changes causing the seal assembly 50 to expand under the increased air pressure. By reducing the voltage, the modulus of the dielectric elastomer material 52 changes back causing the seal assembly 50 to reduce its diameter. A controller 62 based on input signals provided by a sensor 64, for example, can selectively apply an appropriate amount of voltage to the dielectric elastomer.

Figure 11:
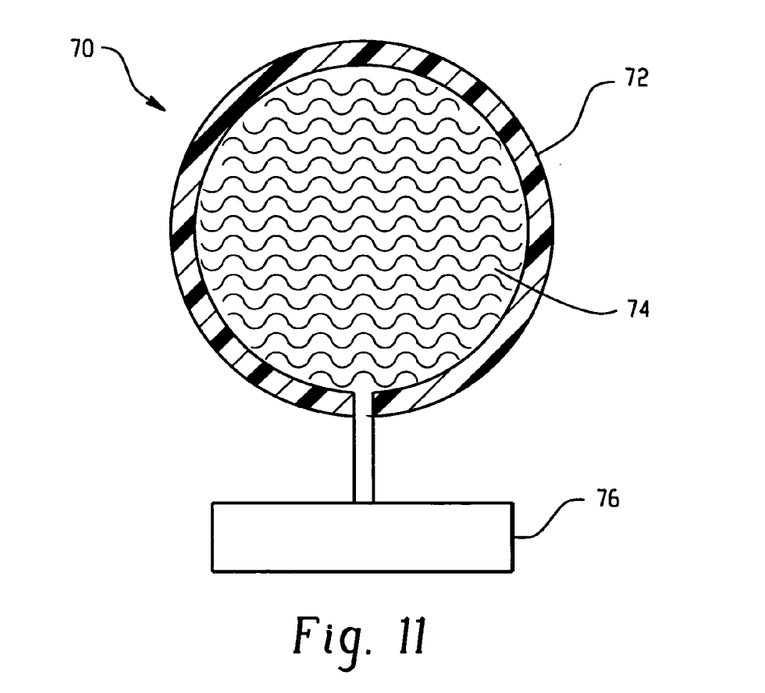
FIGS. 11 and 12 are a cross section and perspective view, respectively, of an active material based seal assembly in accordance with another embodiment.
Figure 12:
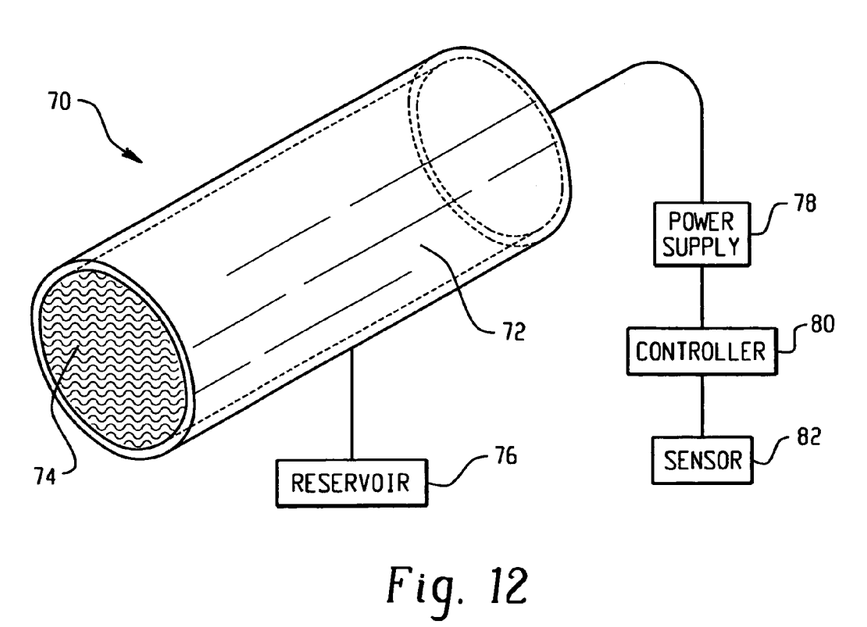

Another embodiment is shown in FIGS. 11 and 12. In this embodiment, a tubular seal shown generally at 70 includes an elastic tubular body 72 filled with an electroactive polymer gel 74, which expands in volume by taking on water and other fluids upon application of an electrical signal. Reversing the electrical signal can reduce the volume. By applying appropriate electrical signals to this electroactive polymer gel 74, fluid from a reservoir 76 can be used to expand the elastic tubular body 72 in diameter and provide additional sealing area and force. Power is applied through a control line from a power supply 78 that is controlled by a controller 80. The controller may receive various input signals from a sensor 82, for example, configured to detect the status of various vehicle components, environmental factors, and the like.

Figure 13:
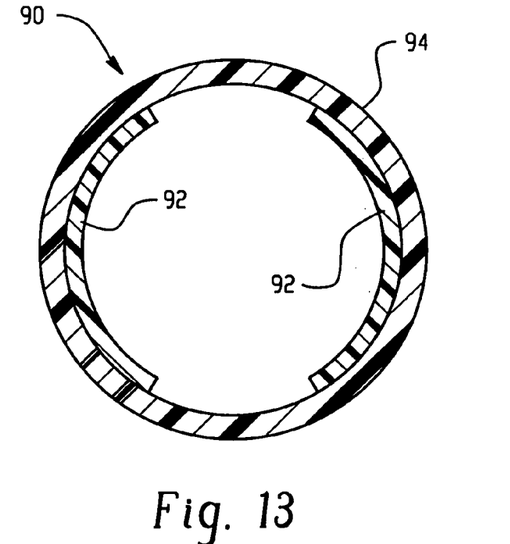
FIGS. 13 and 14 are a cross section and a perspective view, respectively, of an active material based seal assembly in accordance with another embodiment.
Figure 14:
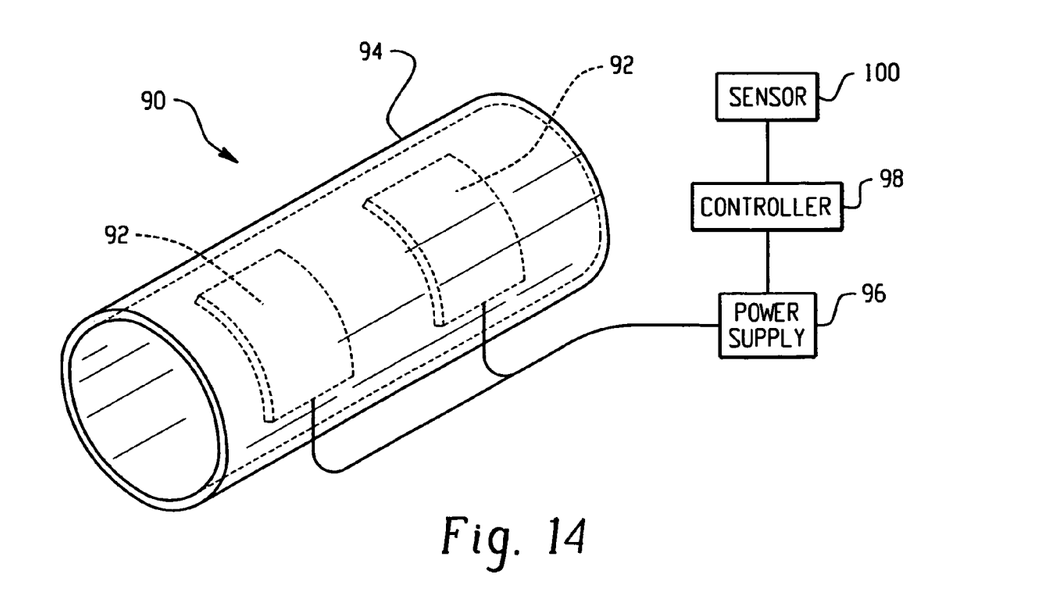

Another example of an expanding seal utilizes active material based bi-morph actuators affixed to the walls of a tubular outer covering material. For example, FIGS. 13 and 14 illustrate a tubular seal assembly generally designated 90 including bimorph actuators 92 disposed on an interior wall of an elastic seal body 94. In this embodiment, activation of the bi-morph materials 92 causes an increase in the diameter of the seal body 94, or can alter the dimensions of the seal body 94 so as to provide additional sealing area and/or alter the closing force. In FIG. 13, the bimorph actuator elements 92 are affixed to the interior walls of an outer seal body 94 so that mechanical loads are transferred between them. The bimorph actuators 94 are activated via an electrical supply line from the power supply 96. The power supply 96 is controlled via a controller 98, which may use various input signals from sensors 100 disposed throughout the vehicle. The bimorph actuators 92 may be one of many active material solutions that provide this behavior including, but not limited to, piezoelectric bimorphs and unimorphs, conducting polymer bimorphs, IPMC's, shape memory alloy based bimorphs, and the like. The bimorph actuators can be spaced apart as shown in FIG. 14 or may be continuous long the length of the seal body 94.

As such, power can be selectively applied to activate the active material and cause contraction, reorientation, or rotation of the cross sectional geometry, and/or length dimension of the active material. Then, upon discontinuing the power, expansion of the seal occurs so as to provide effective sealing engagement between the seal body and the opposing surface. This type of mechanism may be advantageous for those applications where it may be desired to provide effective sealing in the power off mode. For example, in opening a prior art passenger window, friction between a passive seal and the glass can result such that increased force is required for movement of the window to occur. By employing the active material as disclosed, the active seal assembly can eliminate and/or minimize the frictional forces associated with movement of the window and still provide effective sealing engagement upon discontinuation of the activation signal. The illustrated example is not intended to be limited to windows and can be employed for a number of applications where it may be desirable for the active seal assembly to function in the manner described. For example, the seal assembly 90 can be employed for doors in the manner previously described. The position for opening and closing the door is preferably the position that offers greater clearance for the seal assembly as the door is latched. Once the door is fully closed and latched, the seal assembly may be switched to the other stable position to provide an increased seal area and increased pressure. Materials preferable for the bistable assembly as described include dielectric elastomers, shape memory alloys, liquid crystal elastomers, conducting polymers, carbon nanotube actuators, and piezoelectrics and electrostrictive polymers and ceramics.

Figure 15:
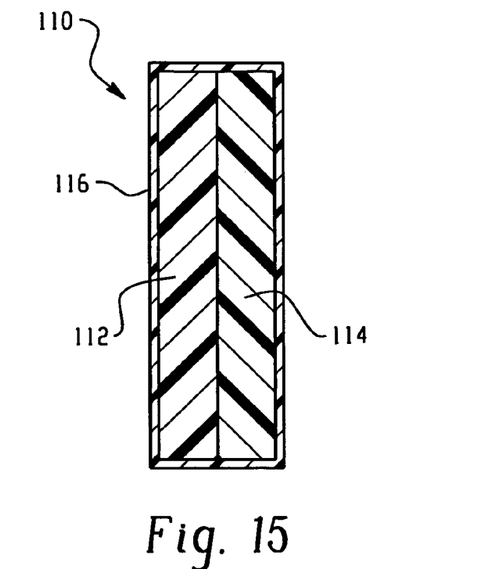
FIG. 15 is a cross section of an active material based seal assembly in accordance with another embodiment.

FIG. 15 illustrates an active material based seal assembly in accordance with another embodiment. The active material based seal assembly 110 comprises a first layer 112 and a second layer 114. The first layer 112 is formed of an active material whereas the second layer 114 is formed of a passive (non-active) elastic material. Although reference is made to two layers, it should be appreciated that the active material based seal assembly may comprise more than two layers. The additional layers may be formed of the active material, which may be the same of different from the first layer 112 and/or may include additional passive layers, which may be the same or different from the second layer 114. Optionally, the active material based seal assembly is encapsulated with a material 116 effective to provide protection from the environment during use. Suitable materials include cloths, membranes, elastic materials, and the like.

The active material based seal assembly shown in FIG. 15 functions as a long cantilevered bending actuator. These can be unimorphs or bimorphs. In the literature, a unimorph actuator is composed of a single active material that can be driven to bend the cantilever in opposite directions by changing the sign of the control signal. Examples of materials for unimorphs are IPMCs, ionic polymer gels, (both of which move ionic species) piezoelectric polymers, electrostrictive polymers, piezoelectric ceramics and various combinations of the foregoing materials. A bimorph actuator is composed of two materials of either active material and an elastic material bonded to it along its length, or two active materials bonded along their length. When one of the component materials is made to deform the cantilever bends due to the differential length change of the active material versus the second the bonded material. In the cantilever configuration, the unimorph or bimorph become a portion of the seal assembly. In FIG. 15 the distal end of the cantilevered seal assembly 110 can be made to contact the opposing surface to contact a seal. For sealing applications, some materials may be appropriate themselves for the outer surface 116 of the seal 110, while others may include a compliant coating material to improve the sealing surface. In this case, the basic unimorph or bimorph can be augmented with a coating of a highly compliant material that will help to form an effective moisture and sound seal when the seal material is activated.

Bimorph configurations can be generalized to have normally bent left, right, or straight configurations that preferentially bias the bending direction. In normally bent configurations, one of the active or elastic materials is bonded such that it is differentially longer or shorter than the second bimorph material. Multilayer configurations may also be used. Non-uniform thickness bimorphs may be used to bias the magnitude of cantilever bending to the left or right. Thickness variations may be used to achieve the desired bending behavior. Physical barriers or conduits on the exterior or at the material interface that preferentially bias the bending direction are useful mainly for unipolar signals such as ionic concentration (such a membrane barrier), pH, magnetic moment (such as a hard ferromagnetic layer), and radiation (such as a light barrier). Preferred materials are those which exhibit large elastic strain limits, and those which can efficiently store mechanical energy. Secondary considerations include those which may be easily bonded to the active material, have properties that are acceptable in the working temperature range, and have adequate toughness to survive repeated actuation. A bimorph may be created for any material in which the material may be driven to bend depending on the control signal. All manner of active materials may be used as a component of the bimorph as well as all manner of elastic materials, such as materials, polymers and ceramics. Additionally, it is recognized that thermoelastic materials may be used as bimorph materials. Therefore, most materials could be used for bimorph-type deformation.

Figure 16A:
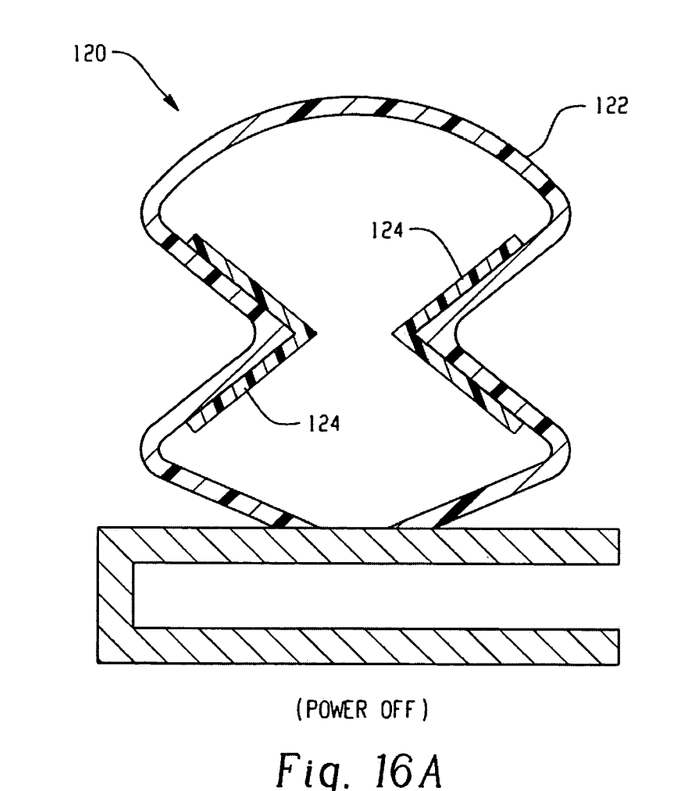
FIGS. 16a and 16b illustrates a sectional view of an active material based seal assembly in the power-off and power-on states in accordance with another embodiment.
Figure 16B:
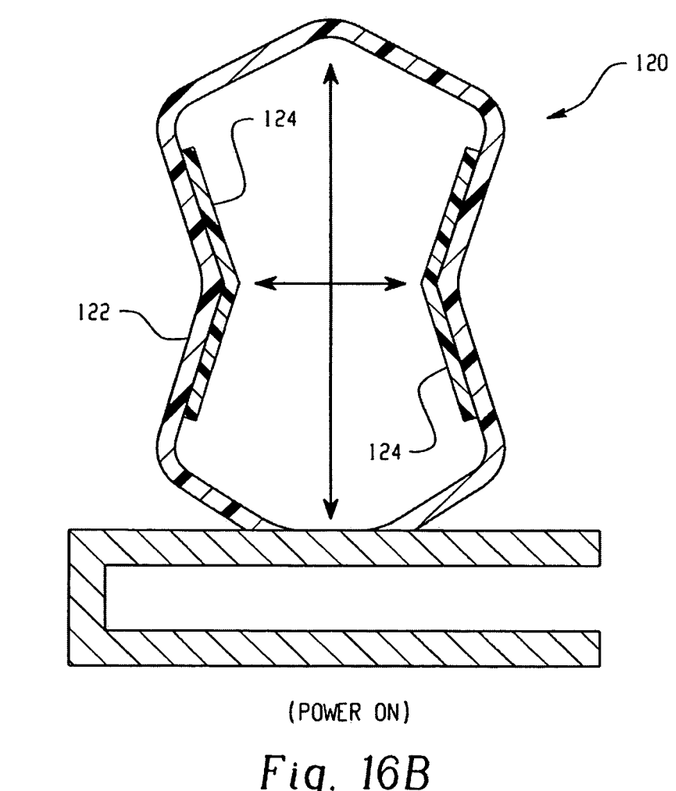

FIGS. 16a and 16b illustrates an active material based seal assembly 120 that employs a geometry that allows for auxetic (or negative Poisson's ratio) type behavior. The seal assembly 120 includes a passive elastic seal body 122 and an active material portion 124 positioned in operative communication with the seal body 122 such that upon activation of the seal assembly 120, the seal body simultaneously expands or contacts in two orthogonal directions. In this manner, the seal assembly 120 can be contracted while the door is being latched and shut, for example, and then subsequently expanded to provide improved sealing characteristics. As such, seal distortion can change as a function of the signal to the active material. Preferably, the active material portion is a bending element such as an IPMC, conducting polymer, a piezoelectric, or a shape memory alloy based bimorph or other material generally suitable for bending actuation.

As previously discussed, the term "active material" refers to several different classes of materials all of which exhibit a change in at least one attribute such as dimension, shape, and/or flexural modulus when subjected to at least one of many different types of applied activation signals, examples of such signals being thermal, electrical, magnetic, stress, and the like. Suitable piezoelectric materials include, but are not intended to be limited to, inorganic compounds, organic compounds, and metal oxides. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metal oxides selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Shape memory polymers (SMPs) generally refer to a group of polymeric materials that demonstrate the ability to return to some previously defined shape when subjected to an appropriate thermal stimulus. The shape memory polymer may be in the form of a solid or a foam as may be desired for some embodiments. Shape memory polymers are capable of undergoing phase transitions in which their shape orientation is altered as a function of temperature. Generally, SMPs are co-polymers comprised of at least two different units which may be described as defining different segments within the copolymer, each segment contributing differently to the flexural modulus properties and thermal transition temperatures of the material. The term "segment" refers to a block, graft, or sequence of the same or similar monomer or oligomer units that are copolymerized with a different segment to form a continuous crosslinked interpenetrating network of these segments. These segments may be combination of crystalline or amorphous materials and therefore may be generally classified as a hard segment(s) or a soft segment(s), wherein the hard segment generally has a higher glass transition temperature (Tg) or melting point than the soft segment. Each segment then contributes to the overall flexural modulus properties of the SMP and the thermal transitions thereof. When multiple segments are used, multiple thermal transition temperatures may be observed, wherein the thermal transition temperatures of the copolymer may be approximated as weighted averages of the thermal transition temperatures of its comprising segments. With regard to shape memory polymer foams, the structure may be open celled or close celled as desired.

In practice, the SMPs are alternated between one of at least two shape orientations such that at least one orientation will provide a size reduction relative to the other orientation(s) when an appropriate thermal signal is provided. To set a permanent shape, the shape memory polymer must be at about or above its melting point or highest transition temperature (also termed "last" transition temperature). SMP foams are shaped at this temperature by blow molding or shaped with an applied force followed by cooling to set the permanent shape. The temperature necessary to set the permanent shape is generally between about 40° C. to about 200° C. After expansion by fluid, the permanent shape is regained when the applied force is removed, and the expanded SMP is again brought to or above the highest or last transition temperature of the SMP. The Tg of the SMP can be chosen for a particular application by modifying the structure and composition of the polymer.

The temperature needed for permanent shape recovery can generally be set at any temperature between about −63° C. and about 160° C. or above. Engineering the composition and structure of the polymer itself can allow for the choice of a particular temperature for a desired application. A preferred temperature for shape recovery is greater than or equal to about −30° C., more preferably greater than or equal to about 20° C., and most preferably a temperature greater than or equal to about 70° C. Also, a preferred temperature for shape recovery is less than or equal to about 250° C., more preferably less than or equal to about 200° C., and most preferably less than or equal to about 180° C.

Suitable shape memory polymers can be thermoplastics, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acids), polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methaciylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbornyl-polyhedral oligomeric silsequioxane), polyvinylchloride, urethane/butadiene copolymers, polyurethane block copolymers, styrene-butadienestyrene block copolymers, and the like.

Conducting polymerization of different monomer segments with a blowing agent can be used to form the shape memory polymer foam, if desired. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N'dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen gas, and the like. The material can then be reverted to the permanent shape by heating the material above its Tg but below the highest thermal transition temperature or melting point. Thus, by combining multiple soft segments it is possible to demonstrate multiple temporary shapes and with multiple hard segments it may be possible to demonstrate multiple permanent shapes.

As previously discussed, other suitable shape memory materials also include shape memory alloy compositions. Shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. A preferred shape memory alloy is a nickel-titanium based alloy commercially available under the trademark FLEXINOL from Dynalloy, Inc. Selection of a suitable shape memory alloy composition depends on the temperature range where the component will operate.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers of the present invention may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method for decreasing a force vector necessary to close a vehicular door in a doorframe, wherein the door defines a surface, said method comprising the steps of:
   attaching an active material based seal assembly to a selected one of the door and doorframe, wherein the active material based seal assembly comprises an active material and an elastic body, the active material abuts an exterior surface of the elastic body and is drivenly coupled to the elastic body, the elastic body engages the non-selected one of the door and doorframe when the door is closed and comprises a barrier intermediate the door and doorframe;
   closing and latching the door against the door frame, such that the door and doorframe engage the seal assembly and the seal assembly imparts a seal pressure against the surfaced; and
   activating the active material to cause a change in a modulus and a shape of the active material in response to an activation signal, wherein the change urges the elastic body towards the surface, and thereby increases the seal pressure exerted by the seal assembly.

2. The method of claim 1, wherein the activation signal is selected from the group consisting of an electrical signal, a magnetic signal, a stress, a thermal signal, and combinations comprising at least one of the foregoing activation signals.

3. The method of claim 1, wherein activating the active material increases a dimension of the active material.

4. The method of claim 1, wherein the active material is selected from the group consisting of dielectric elastomers, shape memory polymers, piezoelectric material, electroactive polymers, magnetorheological elastomers, and electrorheological elastomers.

5. A method for decreasing a force vector necessary to open a vehicular vehicle door in a doorframe, wherein the door defines a surface, said method comprising the steps of:
   attaching an active material based seal assembly to a selected one of the door and doorframe, wherein the active material based seal assembly includes an active material and an elastic body, the active material abuts an exterior surface of the elastic body and is drivenly coupled to the elastic body, the elastic body engages the non-selected one of the door and doorframe when the door is closed and comprises a barrier intermediate the door and doorframe;
   activating the active material to cause a change in a modulus and a shape of the active material in response to an activation signal, wherein the change urges the elastic body towards the surface, and thereby increases a seal pressure exerted by the seal assembly against the surface; is predominately in a direction opposite the force vector;
   unlatching and positioning the door away from the door frame; and
   deactivating the active material.

6. The method of claim 5, wherein the activation signal is selected from the group consisting of an electrical signal, a magnetic signal, an applied stress, a thermal signal, and combinations comprising at least one of the foregoing activation signals.

7. The method of claim 5, wherein activating the active material increases a dimension of the active material.

* * * * *